ADOLF FROHLICH
EDWARD J. HARRIS
INVENTORS

Jan. 19, 1960  A. H. FRÖHLICH ET AL  2,921,337
AUTOMATIC SEALING RING FOR BAGLESS VULCANIZING PRESSES
Filed Dec. 5, 1957  4 Sheets-Sheet 3

ADOLF FRÖHLICH
EDWARD J. HARRIS
INVENTORS

BY William Freeman
ATTORNEY

ADOLF FRÖHLICH
EDWARD J. HARRIS
INVENTORS

United States Patent Office 2,921,337
Patented Jan. 19, 1960

2,921,337

AUTOMATIC SEALING RING FOR BAGLESS VULCANIZING PRESSES

Adolf H. Fröhlich and Edward J. Harris, Akron, Ohio, assignors to The Cleveland Trust Company, Cleveland, Ohio, trustee Application December 5, 1957, Serial No. 700,831

7 Claims. (Cl. 18—17)

This invention relates to the art of vulcanizing presses, and in particular, has reference to that type of vulcanizing press having a sealing ring positionable automatically therein, in lieu of a conventional former.

In the art of vulcanization of pneumatic tires, it has often times been attempted to position an endless bead ring between the bead portions of the tire being cured to effectuate a sealing point that defines a closed internal cavity internally of the tire being cured. In this manner, the bead ring itself bridges the space between the bead portions of the tire so that the bead ring and the tire define the curing chamber within which the vulcanizing medium is introduced. In this manner the conventional pneumatic former is eliminated, with the vulcanizing medium being directly applied against the internal surface of the tire so as to effectuate vulcanization thereof.

In the prior art, several attempts have been made to provide a satisfactory bagless device of this character.

In co-pending application Serial No. 565,721, filed February 15, 1956, by Adolf Fröhlich and Edward J. Harris, there was disclosed an improved type of sealing ring that is characterized by the use of a hinge type construction wherein the sealing ring was divided into a pair of semi-hemispherical segments that were hinged together at their ends, so as to be collapsible to a condition of reduced dimension across one width thereof.

While this hinging action operated to reduce the effective dimension in one direction, the salient fact remains that the remaining dimension, 90° thereto, remained unaffected due to the fact that no collapse was made between the jointed ends of the individual segments.

In co-pending application Serial No. 600,935, filed July 30, 1956, by Adolf Fröhlich and Edward J. Harris, there was disclosed a sealing ring of this general character that featured a further improvement in that the same was, in addition to being collapsed by a hinging action, tilted with respect to the vertical axis of the mold section, with the result that the effective diameter thereof, was decreased in all directions so that this ring could easily be passed between bead sections of the tire and then subjected to a straightening and uncocking action, so as to be positioned interiorly of the tire between the bead portions thereof.

In co-pending application, Serial No. 600,903, filed July 30, 1956, by Adolf Fröhlich and Edward J. Harris, there was disclosed an even further improvement over the above referred to co-pending applications wherein, in addition to the collapsing action described, there was also provided a transverse shifting that operated to automatically strip the tire from the mold after curing.

While the above types of automatically positionable sealing rings have been satisfactory in several regards, it has been necessary in these cases to initiate positioning of the bead ring upon contact between the same and the opposed mold section. Thus, the positioning of the bead ring occurred only after contact with the mold section opposed thereto.

It has been found that if the movement and positioning of the bead ring is not made dependent upon contact with the remaining mold section, that improved results will occur.

In this regard, it has been found as a first advantage, that if the positioning occurs before contact with the remaining mold section, that this positioning can occur in such fashion as to positively grip the upper portion of the tire in the bead region thereof, with the result that the same will be firmly grasped during the shaping of the same during subsequent movement of the mold sections toward their closed positions.

As a second advantage, it has been found that by utilizing this type of arrangement wherein the hinging of the bead ring occurs upon movement of certain component parts of the mold section carrying the same, that improved results can be obtained in stripping the tire from the mold after cure, since this arrangement will permit the mold sections to be initially separated before movement of the bead ring, with the result that the bead ring will be enabled to strip the tire from the mold sections easier in view of the fact that clearance will be provided between the separate mold sections.

It accordingly becomes a principal object of this invention to provide an improved type of sealing ring, that is characterized by a combined hinging and cocking action, with such hinging and cocking of the sealing ring being achievable during the time that the relative movable mold sections are separate and out of contact with each other.

It is a still further object of this invention to provide a sealing ring that is carried by moveable mold section and which is shiftable relatively of the mold section carrying the same.

These and other objects of the invention will become more apparent upon a reading of the following brief specifications, considered and interpreted in the light of the accompanying drawings.

Figure 1:
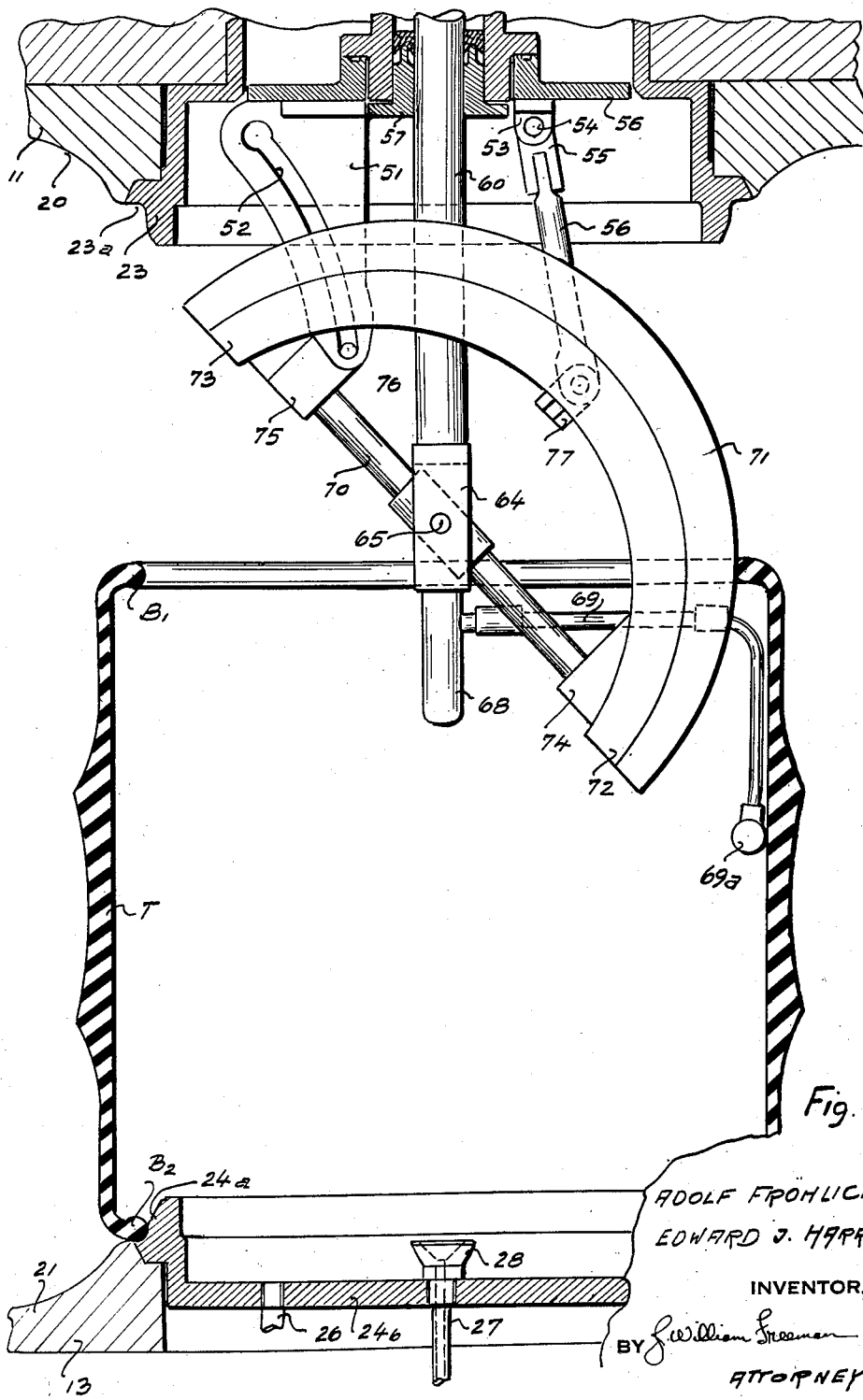
Figure 1 is an elevational view, partly broken away in section, and showing the position of the component parts during an initial period of closure.
Figure 2:
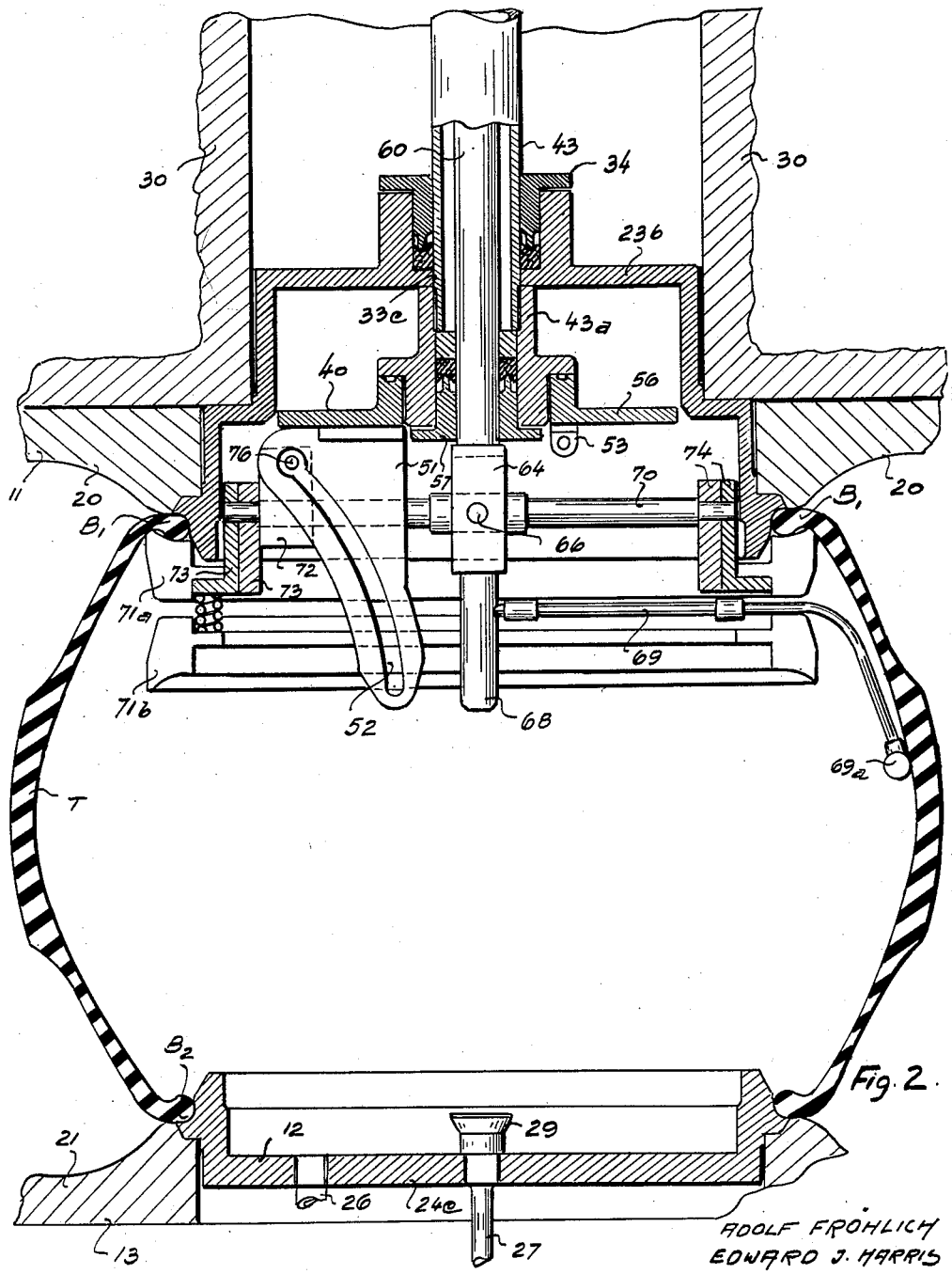
Figure 2 is a view similar to Figure 1, but showing the position of the component parts during the initial stage of shaping.
Figure 3:
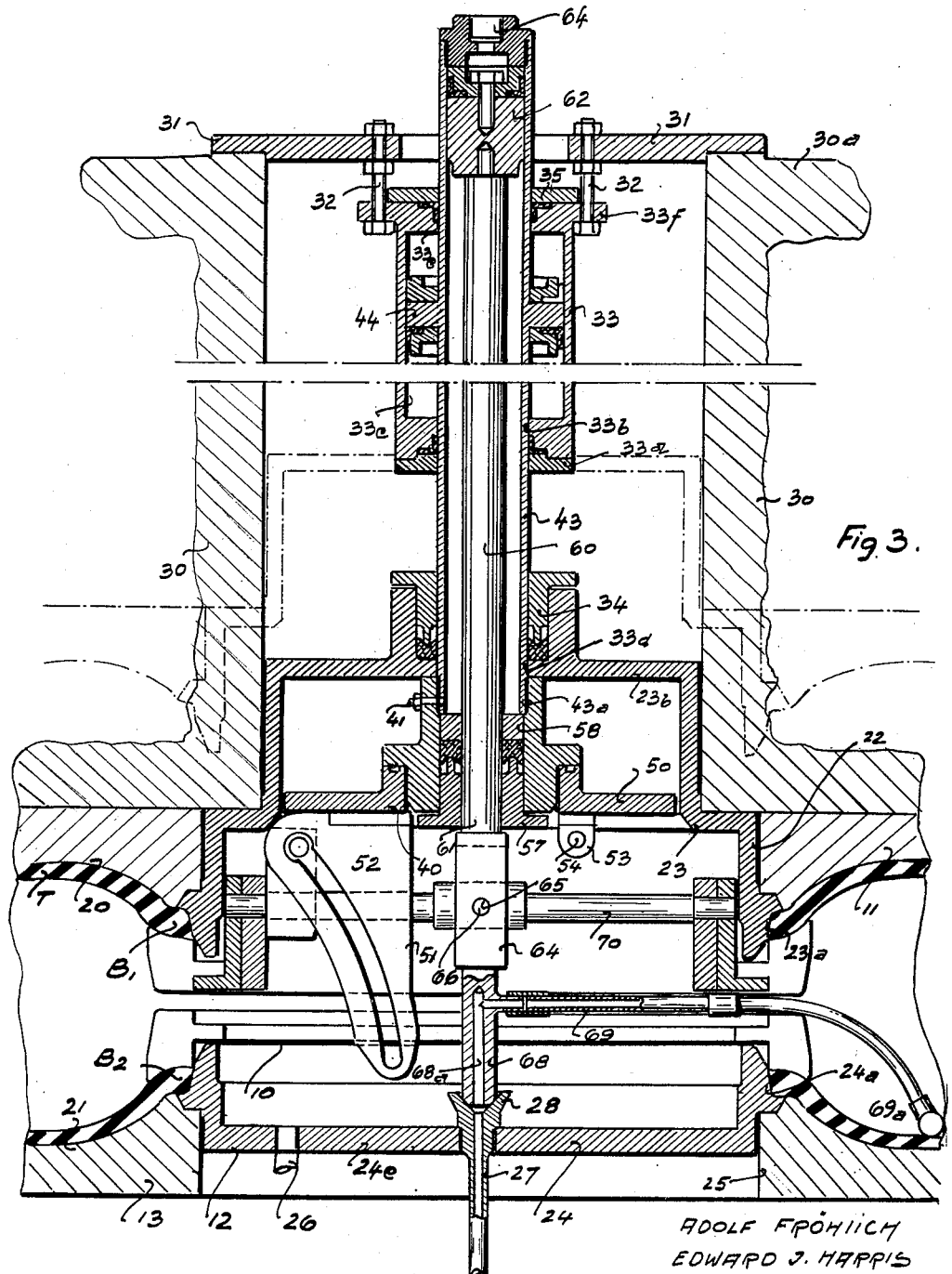
Figure 3 is a view similar to Figures 1 and 2, but showing the press in its fully closed condition.
Figure 4:
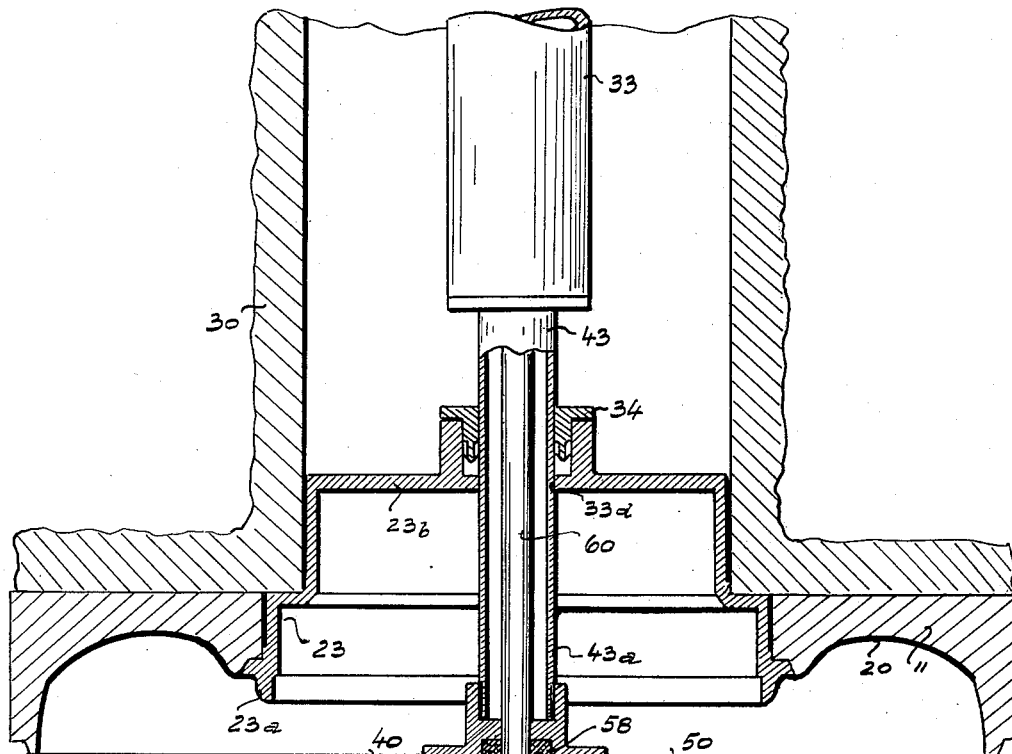
Figure 4 is a similar view, but illustrating a tire being stripped from the lower mold section upon opening of the press.

Referring now to the drawings, and in particular to Figures 1 through 4 thereof, the improved sealing ring, generally designated by the numeral 10, is shown carried by an upper mold section 11 of a vulcanizing press, so as to have the opposed axial edge portion thereof positionable between the beads $B_1$ and $B_2$ of a tire T, with the tire T being supported on bead seat means 12 of lower mold section 13; the arrangement being such that the tire will be deformed to the toroidal shape of Figures 2 through 4 by the automatic positioning of the ring 10 during closure of the press to the position of Figure 3.

With regard to the press structure, it has been previously indicated that the mold sections 11 and 13 may be carried by any suitable type of press mechanism that operates to move these mold sections relatively of each other between open and closed positions. Accordingly, attention is directed to co-applicants' co-pending application, Serial No. 480,517, filed January 7, 1955, disclosing a press of this general type.

Descriptions of the mold sections 11 and 13

Referring now to the drawings, it will be seen that each mold section 11 and 13 is provided with appropriate design-imparting surfaces 20 and 21 respectively, with the upper mold section 11 being additionally apertured as at 22, for reception of a bead seating ring 23, while a similar bead seating ring 24 is received within the aperture 25 of lower mold section 13. It is believed understood that the bead seat members 23 and 24 have circular bead seats 23a and 24a respectively, against which the bead members $B_1$ and $B_2$ of the tire T may be seated. Additionally, the members 23 and 24 are provided with axial end walls 23b and 24b, so that when the mold sections 11 and 13 are in the closed position of Figure 3, a fully closed internal chamber will be provided.

In this regard, it is also to be understood that the bead seat 23 is preferably fixed with respect to upper mold section 11, while the bead seat member 24 is similarly secured with respect to lower mold section 13. It is to be understood, however, that ejector means could be employed to automatically unseal the member 24 from lower mold section 13 if desired.

In addition to the axial end wall 24b, member 24 also includes an inlet line 26, as well as an exhaust line 27 which terminates in a female fitting 28 within which is seated certain component elements of the sealing ring 10, as will be presently described. Further, the upper mold section 11 also is provided with additional structure for supporting the ring 10 with respect thereto in relatively shiftable relationship therewith. To this end, the upper mold surface of the mold section 11 is shown (see Figure 3) as receiving a concentrically projecting cylinder 30 having secured to the projecting end 30a thereof, from which may be suspended, through bolts 32, 32, a cylindrical sleeve 33; the arrangement being such that certain component parts of the ring 10 will be telescoped concentrically within sleeve 33, while being shiftable relatively thereof.

Sealing ring 10

As has been previously indicated, the sealing ring 10 is shiftably carried by the upper mold section 11, and is also collapsible and cockable between the positions of Figures 1 and 3 upon relative movement and coaction between certain component parts thereof.

Before commencing a detailed discussion of the sealing ring 10, per se, it will first be undertaken to describe the actuating mechanism therefor.

Accordingly, and referring first to Figure 3, it will be seen that these actuating means include guide means 40 that are secured, as by bolts 41, 41 to the lower end 42a, of a cylindrical sleeve 43a, with sleeve 43 being telescoped within circular opening 33b that is provided on end wall 33a of sleeve 33. Additionally, the sleeve 43 further includes a radially projecting flange 44, that rides against the internal wall surface 33c of sleeve 33. In this manner it will be seen that the guide means 40, and sleeve 43, will move as a unit relatively of sleeve 33, and upper mold section 11, with sleeve 43 also being concentrically telescoped with respect to apertures 33d and 33e and packings 34, 35 that are provided in the wall 23b of member 23, and in end wall 33f of sleeve 33, respectively.

In order that relative movement may ocur between the guide means 40 and the sealing ring 10 per se, the guide means 40 also includes a circular plate 50 that is secured to sleeve 43 adjacent the lower most end 43a thereof, with plate 50 having an elongate cam plate 51 of generally triangular configuration depending therefrom. An arcuate slot 52 is provided in the cam plate 51 for coaction with components of ring 10 as will be presently described. Also secured to the under surface of plate 50 are a pair of lugs 53, 53, with each lug 53 having a pivot point 54, within which may be mounted a swivel 55, with each swivel 55 also pivotally receiving a link arm 56. These link arms 56 are in turn secured to the ring 10 as will be described later.

Additional parts of the guide means 40 include a bushing 57 and a packing 58 that coact with a ring-supporting shaft 60 as will now be described.

In this regard, the sealing ring 10 per se is carried by the lowermost end 61 of a ring-supporting shaft 60, with shaft 60 being telescopically received in concentricity with sleeve 43 as is shown in the drawings, and with the upper end of shaft 60 being enlarged, as at 62, so as to form a piston head against which steam entering through port 64 may act. Adjacent the lower most end of shaft 60, there is provided a forked fitting 64 having apertures 65, 65 through which a pin 66 may be received. In this manner a transverse shaft 70 may be mounted with respect to shaft 60, with shaft 70 being swingable about the pivot point of pin 66, between the positions of 1 and 3.

In addition to the aforementioned component parts, the fitting 64 also defines a concentric extension 68 having a blind bore 68a (see Figure 3) which communicates with a condensate line 69 that terminates in a pick up head 69a, and with the extreme projecting end of extension 68 being seated in female fitting 28 so that condensate occuring interiorly of tire T will be picked up by head 69a for exhaust through line 27.

It has been previously indicated that the shaft 70 is swingable about pivot point 66, and as best shown in Figure 1, the sealing ring 10 is in actuality made up of a pair of aligned pairs of semi-circular segments, that have their arcuate ends rotatably mounted about the axial ends of shaft 70 and being swingable between the collapsed condition of Figure 1 and the co-planar condition of Figure 2, upon relative movement between shaft 60 and sleeve 43. Accordingly, in Figure 1, one set of said segments, referred to by the numeral 71, 71, are shown having their respective arcuate ends 72 and 73 journaled through bushings 74 and 75 around the axial ends of shaft 70. It is to be understood that a second set of such segments is provided with references being had to applicants' co-pending application, Serial No. 600,900, filed July 30, 1956, for a detailed disclosure in this regard.

In order to facilitate coaction between the guide means 40 and the sealing ring 10, the shaft 70 further includes a pin 76 that is received in arcuate slot 52. Also a medial section of each member 71 is provided with a lug 77 to which may be pivotally secured to the free end of link 56. In this manner, the sealing ring 10 will be pivoted about shaft 70, and also will be pivoted about the lowermost end of shaft 60, and will also be secured with respect to guide means 40 by pin 76 and kinks 56, 56. Accordingly, as the position of shaft 60 with respect to cylinder 43 changes, it is believed apparent that a pivoting of the members 71, 71 around the pivot point 66, will occur; with the pin 76 determining the angular disposition of shaft 70 to horizontal, while links 56, 56 will serve to move the member 71, 71 about shaft 70 into a condition of co-planar relationship with each other.

Use or operation of the device

In use or operation of the improved device, it will first be assumed that the component parts are in the position of Figure 1, with the tire T having its bead portion $B_2$ placed on the bead set 24a of member 24, and with the upper mold section 11 having been partially lowered so that the ring mechanism 10 has had its maximum diameter point moved past the upper bead portion $B_1$.

At this point, the press will be closed slightly further with the shaft 60, sleeve 43, and upper mold section 11 all moving in unison until such time as the pin 65 reaches the approximate position shown in Figure 1. At this point, the sleeve 43 will be moved relatively of cylinder 33 and shaft 60, as by causing the introduction of pressurized medium through port 90 (see Figure 3). Upon such movement, the pin 76 will move relatively of slot 52 to effectuate a movement of shaft 70 to the horizontal condition of Figure 2, at which time the pin 76 will be in the uppermost portion of slot 52 as indicated. During this just described movement of the pin 76 in slot 52, there will also simultaneously occur a movement of members 71, 71 about the shaft 70, with the link arms 56, 56 causing these members 71, 71 to move into coplanar relationship with each other as is shown in Figure 2.

The result of the just described movement will be that the upper bead $B_1$ will be firmly grasped between the sealing ring 10 and the bead set 23a, while sleeve 43 will have been moved to its maximum point of extension with respect to shaft 60.

At this point, the press may be now closed with mold section 11, sleeve 43, and shaft 60 all moving in unison until the position of Figure 3 is reached, at which time the sealing ring 10 will be firmly positioned between the opposed beads of the tire. At this point, vulcanizing medium can be introduced through inlet 26, and in view of the fact that each section 71 is defined by sealing members 71a and 71b that are urged apart as taught in co-pending application Serial No. 600,903, the vulcanizing medium can be introduced directly against the interior wall surface of the tire.

During the time that vulcanization is occurring, it is believed apparent that any condensate occurring in the interior of the tire will be picked up by head 69A and emitted through exhaust line 27.

When the vulcanizing cycle has been completed and it is desired to remove the tire, the press is first opened as by moving the upper mold section 11 to the chain dotted line of Figure 3 while retaining the shaft 60, and sleeve 43 in the full line positions of Figure 3. In this manner, the upper mold section 11 will move relatively of the components 43 and 60, with the result that the design-imparting surface 20 will be stripped from the upper half of the cured tire while the sealing ring, being initially retained in place, will keep the tire in contact with the design-imparting surface 21 of the lower mold section 13.

At such time as the components have reached the condition illustrated in dotted lines in Figure 3, the members 43 and 60 may be raised to effectuate stripping of the tire and movement to the condition of Figure 4, at which time the tire is completely separate from the mold section. In this condition, the tire T may then be removed from the sealing ring 10 by effectuating relative movement between shaft 60 and sleeve 43, which results in a cocking and collapsing of the sealing ring so as to automatically remove the same from the cured tire which will then fall onto the lower mold section whereupon it can be removed.

Upon removal of the tire as just described, the press may be opened to its fully opened position, at which time a new tire T may be placed thereon for repetition of the above-described cycle of events.

While a full and complete description of the invention has been set forth in accordance with the dictates of the patent statutes, it is not intended that the invention be so limited. Accordingly, while an axial urged-apart type of sealing ring has been described in the preferred embodiment, it is to be understood that this type of sealing ring is not mandatory to the operation of the invention herein described.

Accordingly, modification of the invention may be resorted to without departing from the spirit hereof, or the scope of the appended claims.

This application is a continuation-in-part of co-pending application, Serial No. 600,935, filed July 30, 1956, by Adolf Fröhlich and Edward J. Harris; is a continuation-in-part of copending application, Serial No. 565,721, filed February 15, 1957, by Adolf Fröhlich and Edward J. Harris; and is also a continuation-in-part of co-pending application Serial No. 600,903, filed July 30, 1956, by Adolf Fröhlich and Edward J. Harris.

What is claimed is:

1. In combination with a vulcanizing press having complemental, relatively movable first and second mold sections each having a bead seat and with said mold sections being movable between open and closed positions; a sealing ring mechanism carried by said first mold section; said sealing ring mechanism including; a shaft projecting axially of said first mold section; a frame member pivoted in its central portion to the projecting end of said shaft; a pair of semi-circular bead segments, hinged together at their arcuate ends about opposed ends of said frame members; means for rotating said bead segments into coplanar relationship with each other upon closing of said press; and means carried by said first mold section for rotating said frame member about said shaft at its point of connection therewith; at least one said means being operative during closing of said press and prior to contact between the projecting end of said shaft and said second mold section.

2. In combination with a vulcanizing press having complemental, relatively movable first and second mold sections each having a bead seat and with said mold sections being movable between open and closed positions; a sealing ring mechanism carried by said first mold section; said sealing ring mechanism including; a shaft projecting axially of said first mold section; a frame member pivoted in its central portion to the projecting end of said shaft; a pair of semi-circular bead segments, hinged together at their arcuate ends about opposed ends of said frame member; means carried by said first mold section for rotating said bead segments into coplanar relationship with each other upon closing of said press; and means carried by said first mold section for rotating said frame member about said shaft at its point of connection therewith; both said means being operative during closing of said press and prior to contact between the projecting end of said shaft and said second mold section.

3. In combination with a vulcanizing press having complemental, relatively movable first and second mold sections each having a bead seat and with said mold sections being movable between open and closed positions; a sealing ring mechanism carried by said first mold section; said sealing ring mechanism including; a shaft projecting axially of said first mold section; a frame member pivoted in its central portion to the projecting end of said shaft; a pair of semi-circular bead segments, hinged together at their arcuate ends about opposed ends of said frame member; means carried by said first mold section for rotating said bead segments into coplanar relationship with each other upon closing of said press; and means carried by said first mold section for rotating said frame member about said shaft at its point of connection therewith; said means for rotating said bead segments including a link connection between said first mold section and one said bead segment.

4. In combination with a vulcanizing press having complemental, relatively movable first and second mold sections each having a bead seat and with said mold sections being movable between open and closed positions; a sealing ring mechanism carried by said first mold section; said sealing ring mechanism including; a shaft projecting axially of said first mold section; a frame member pivoted in its central portion to the projecting end of said shaft; a pair of semi-circular bead segments, hinged together at their arcuate ends about opposed end of said frame member; means carried by said first mold section for rotating said bead segments into coplanar relationship with each other upon closing of said press; and means carried by said first mold section for rotating said frame member about said shaft at its point of connection therewith; said means for rotating said frame member including a plate carried by said first mold section and having a slot therein; a pin carried by one said bead segment and being received in said slot.

5. The device of claim 4 further characterized by the fact that said plate is movable relatively of said shaft, whereby said pin will move in said slot upon relative movement between said plate and said pin.

6. The device of claim 4 further characterized by the fact that said plate is movable relatively of the mold section supporting the same.

7. In combination with a vulcanizing press having complemental, relatively movable first and second mold sections each having a bead seat and with said mold sections being movable between open and closed positions; a sealing ring mechanism carried by said first mold section; said sealing ring mechanism including; a shaft projecting axially of said first mold section; a frame member pivoted in its central portion to the projecting end of said shaft; a pair of semi-circular bead segments, hinged together at their arcuate ends about opposed ends of said frame member; means carried by said first mold section for rotating said bead segments into coplanar relationship with each other upon closing of said press; and means carried by said first mold section for rotating said frame member about said shaft at its point of connection therewith; said means for rotating said bead segments including a link connection between said first mold section and one said bead segment; said means for rotating said frame member including a plate carried by said first mold section and having a slot therein; a pin carried by one said bead segment and being received in said slot.

References Cited in the file of this patent
UNITED STATES PATENTS

| | | |
|---|---|---|
| 1,670,446 | Gammeter | May 22, 1928 |
| 1,713,658 | Hopkinson | May 21, 1929 |
| 1,757,376 | Laursen | May 6, 1930 |
| 2,834,049 | White | May 13, 1958 |